United States Patent
Cheruku et al.

(10) Patent No.: US 10,565,549 B2
(45) Date of Patent: Feb. 18, 2020

(54) SYSTEM AND METHOD FOR MANAGING RETAIL PRODUCTS

(71) Applicant: Walmart Apollo, LLC, Bentonville, AR (US)

(72) Inventors: Aditya R. Cheruku, Bentonville, AR (US); Stephen Steel, Bentonville, AR (US); Hamza Farooq, Rogers, AR (US); Trinath Patri, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 253 days.

(21) Appl. No.: 15/683,279

(22) Filed: Aug. 22, 2017

(65) Prior Publication Data

US 2018/0060804 A1 Mar. 1, 2018

Related U.S. Application Data

(60) Provisional application No. 62/378,433, filed on Aug. 23, 2016.

(51) Int. Cl.
*G06Q 10/08* (2012.01)
*G06K 9/00* (2006.01)
(Continued)

(52) U.S. Cl.
CPC ....... *G06Q 10/087* (2013.01); *G06K 9/00624* (2013.01); *G06K 9/00771* (2013.01);
(Continued)

(58) Field of Classification Search
CPC ............................... G06Q 10/087; G06T 7/00
See application file for complete search history.

(56) References Cited

U.S. PATENT DOCUMENTS 8,325,036 B1 12/2012 Fuhr
8,630,924 B2 1/2014 Groenevelt
(Continued)

FOREIGN PATENT DOCUMENTS

WO 2014102797 7/2014

OTHER PUBLICATIONS

Kumar, Swagat, et al.; Remote Retail Monitoring and Stock Assessment using Mobile Robots; 2014 IEEE International Conference on Technologies for Practical Robot Applications; Apr. 2014; pp. 1-9.
(Continued)

*Primary Examiner* — A. Hunter Wilder
(74) *Attorney, Agent, or Firm* — Fitch, Even, Tabin & Flannery LLP (57) ABSTRACT

In some embodiments, apparatuses and methods are provided herein useful to monitoring retail products. In some embodiments, there is provided a system for monitoring retail products including: one or more shelf image capturing devices disposed within a retail shopping facility. The one or more shelf image capturing devices configured to capture shelf images of retail store shelves. The captured shelf images having an associated shelf timestamp. By one approach, a control circuit in communication with the one or more shelf image capturing devices is configured to analyze the captured shelf images by comparing brightness, contrast levels, and luminous intensity at a particular frequency between at least two shelf images of the captured shelf images to determine a rate of shelf product depletion for a particular retail product and send a shelf depletion warning regarding a particular retail item to an associate device or a central computer.

20 Claims, 8 Drawing Sheets

(51) Int. Cl.
*G06K 9/46* (2006.01)
*G06K 9/62* (2006.01)
*G06K 9/78* (2006.01)
*G06Q 10/06* (2012.01)
*G06Q 20/20* (2012.01)

(52) U.S. Cl.
CPC ......... *G06K 9/4661* (2013.01); *G06K 9/6202* (2013.01); *G06K 9/78* (2013.01); *G06Q 10/06315* (2013.01); *G06Q 20/203* (2013.01); *G06K 2209/27* (2013.01)

(56) References Cited

U.S. PATENT DOCUMENTS

| | | | |
|---|---|---|---|
| 8,873,794 B2 | 10/2014 | Sorensen | |
| 9,024,755 B2 | 5/2015 | Fuhr | |
| 9,129,277 B2 | 9/2015 | MacIntosh | |
| 2003/0154141 A1 | 8/2003 | Capazario | |
| 2009/0063307 A1* | 3/2009 | Groenovelt | G06Q 10/087 705/28 |
| 2013/0039543 A1* | 2/2013 | Fuhr | G06Q 10/087 382/103 |
| 2015/0073925 A1* | 3/2015 | Renfroe | G06Q 30/0641 705/15 |
| 2016/0203429 A1* | 7/2016 | Mellott | G06Q 10/06315 705/7.25 |
| 2016/0253883 A1* | 9/2016 | Westmacott | H04N 7/181 348/159 |
| 2019/0073627 A1* | 3/2019 | Nakdimon | G06K 7/10425 |

OTHER PUBLICATIONS

Mathecys; Visual Shelf Monitoring; http://mathecsys.com/visual-shelf-monitoring; Available at least as early as Jun. 6, 2016; pp. 1-3.

Moorthy, Rahul, et al.; Applying Image Processing for Detecting On-Shelf Availability and Product Positioning in Retail Stores; WCI '15 Proceedings of the Third International Symposium on Women in Computing and Informatics; ACM Publications; Aug. 10-13, 2015; pp. 451-457.

Tata Consultancy Services; "Advanced Image Matching Techniques for Planogram Compliance"; https://www.tcs.com/content/dam/tcs/pdf/Industries/Retail-logistics/Abstract/advanced-image-matching-techniques.pdf; Retrieved on Jul. 5, 2019; pp. 1-4.

USPTO; U.S. Appl. No. 15/683,260; Notice of Allowance dated Jul. 25, 2019; (pp. 1-20).

* cited by examiner

SYSTEM AND METHOD FOR MANAGING RETAIL PRODUCTS

CROSS-REFERENCE TO RELATED APPLICATION

This application claims the benefit of U.S. Provisional Application No. 62/378,433, filed Aug. 23, 2016, and is incorporated herein by reference in its entirety.

TECHNICAL FIELD

This invention relates generally to monitoring retail shelves and stock levels, and more particularly, to managing or preventing shelf stockouts using image analytics.

BACKGROUND

Retail shelves require frequent restocking of popular retail products, especially during busier times of the day or year, such as during the holidays. If a shelved product, particularly a popular product, has a decreased shelf supply or, even worse, is not available on a shelf when customers search for it, a retail facility may suffer lost sales. So, it would improve the customer experience and be economically beneficial for the retail facility to be proactive in managing the retail shelves and stock levels to avoid shelf stockouts.

BRIEF DESCRIPTION OF THE DRAWINGS

Disclosed herein are embodiments of systems, apparatuses and methods pertaining to managing shelf levels. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for monitoring retail shelves. In some embodiments, there is provided a system including one or more shelf image capturing devices disposed within a retail shopping facility. The one or more shelf image capturing devices may capture shelf images of retail store shelves. The captured shelf images having a shelf timestamp associated therewith. The system may also include a control circuit in communication with the one or more shelf image capturing devices. The control circuit may analyze the captured shelf images by comparing brightness, contrast levels, and luminous intensity at a particular frequency between at least two shelf images of the captured shelf images and the associated shelf timestamp to determine a rate of shelf product depletion for a particular retail product. The control circuit may also send a shelf depletion warning for a particular retail item to an associate device or a central computer. The image capturing devices also may be located in a stock room. The shelf or stock image capturing devices may be a number of different cameras available. In light of the number of image capturing devices that may be required to provide thorough coverage of a retail shopping facility, fairly inexpensive cameras may be employed and the images may undergo post-capture processing, such as image contrast enhancement or dynamic range reduction. By one approach, the images are analyzed by comparing groups of clustered pixels.

In addition to analyzing store shelves such as display shelves or those available to shoppers, the system may include image capturing devices in a stock or storage room or area to capture stock images of a stock location. Further, these images may have a timestamp associated therewith such that the control circuit can analyze the captured stock images as mentioned above, to determine a rate of stock depletion. Furthermore, a stock depletion warning for a particular item may be sent to a supply chain management server or central computer. In this manner a notice may be sent to a distribution center, supplier, or other entity to notify them of a need to send additional stock by initiating a stock shipment or to help or permit them to forecast retail restocking needs. The shelf depletion warning or the stock depletion warning may include a rate of shelf product depletion, a rate of stock depletion, a shelf request, a stock request, and/or historical rate depletion information.

To provide a point of comparison with the stock and product depletion data gathered from the shelf or stock image capturing devices, the system may further analyze information from one or more point of sale terminals in communication with a control circuit. The point of sale terminal and/or the control circuit can track purchase of products and the rate of sale, which may then be compared with depletion rates from the shelves and stock areas. Comparing this information also may provide a manner of identifying product theft or mis-shelved products by looking at the product on the store shelves and in the stock rooms, the products purchased, and the products shipped or delivered to the retail shopping facility.

In some embodiments, there is provided a computer-implemented method for monitoring retail products including capturing shelf images of retail store shelves in a retail shopping facility. The captured shelf images having a shelf timestamp associated therewith. The computer-implemented method may include analyzing, via a control circuit, the captured shelf images by comparing brightness, contrast levels, and luminous intensity at a particular frequency between at least two shelf images and the associated shelf timestamp. The computer-implemented method may also include determining a rate of shelf product depletion for a particular retail product and sending a shelf depletion warning to an associate device or a central computer, the shelf depletion warning for a particular retail item.

A system is disclosed that predicts out of stock situations on shelves (stockouts) located on the sales floor of a retail store (and possibly the stock area or stock room, in some embodiments). The system may use an image capturing device to capture at least one of a plurality of images or a plurality of videos of one or more shelves on the sales floor (or stock room, depending on the configuration). The image capturing device may be placed, for example, opposite a shelf. By one approach, one or more images of the shelf are captured at regular intervals throughout the day, such as during the hours the retail facility is open to customers. In one illustrative approach, each image shows one or more product items, which can be at different inventory or stock levels. Further, each inventory level may correspond to a particular pixel intensity. The system may be trained to analyze differences in pixel intensities between the captured images of the shelves. Further, the system may be trained to analyze differences in brightness and contrast levels as well.

In some embodiment, real time image analytics are applied to analyze products on a shelf (or a shelf where products are to be shelved according to a planogram or previous product placements) and determine whether a particular shelf is fully stocked, out of stock, or nearly out of stock. When the quantity of the particular product reaches a particular threshold (that may change depending on the product, rate of depletion, time of day or year, among other factors), the system can trigger one or more alerts to department managers or store associates. Further, the system may initiate a signal to automatically replenish the products on the shelf to maintain on shelf availability (OSA), by notifying one or more associates or workers to pick or obtain products form a stock area and restock the shelf. Accordingly, the real-time image analytics permits the control circuit to determine rates of shelf or stock product depletion for a plurality of retail products as the products are being pulled from shelves and to instruct the associates or store employees to restock retail products (possibly even before the products have been purchased because the system herein does not rely solely on the data from point of sale terminals).

As noted, the system may instruct a store associate to restock certain shelves that are running low on products. Further, the control circuit may indicate the order in which store shelves are restocked, which can be particularly helpful during busy times of the year or times of the day. For example, in one configuration, the control circuit, after determining rates of shelf product depletion, may instruct the associate to restock retail products with a higher rate of shelf product depletion than those retail products with lower rates of shelf product depletion. In this manner, if two shelves only have two products therein, but one of the shelves displays products that are sold at a much higher rate, the shelf with goods selling at the higher rate (which has the higher shelf product depletion) should be re-shelved first, in one exemplary approach. In yet another configuration, the control circuit may have an associate restock the shelves having goods with the higher margin products displayed therein.

The shelf image capturing devices are configured to capture images of the shelves at periodic times and this may occasionally occur when a customer is shopping in the aisle such that the customer may obscure the camera's view of the shelf In one approach, the image capturing devices are configured to delete those images so that no storage space is lost to unusable images. Nonetheless, in one configuration, the number of deleted images is tracked and a report of the number of deleted images is provided to the control circuit. In this manner, the control circuit may estimate customer foot traffic in front of the image capturing device based on the number of deleted images. Further, the control circuit may use this information to estimate rates of shelf product depletion in this aisle and possibly others, based partly on customer traffic. The estimate rates of shelf product depletion may be provided to store employees, such as through associate devices, so that associates can plan shelf stocking based on anticipated shelf depletion. This also can be used request additional stock or provided to a supply chain management server to plan additional shipment of products.

While the information obtained from the shelf and stock image capturing devices and the point of sale terminals is helpful for planning or estimating the retail needs of a retail facility, the information also may be prepared in a report that may include depletion rates, depletion times, frequency of restocking, customer traffic, estimated depletion rates, along with other information, such as customer demographic or geographic location. This report may be provided to suppliers or vendors so that they can assess success of certain retail products.

Figure 1:
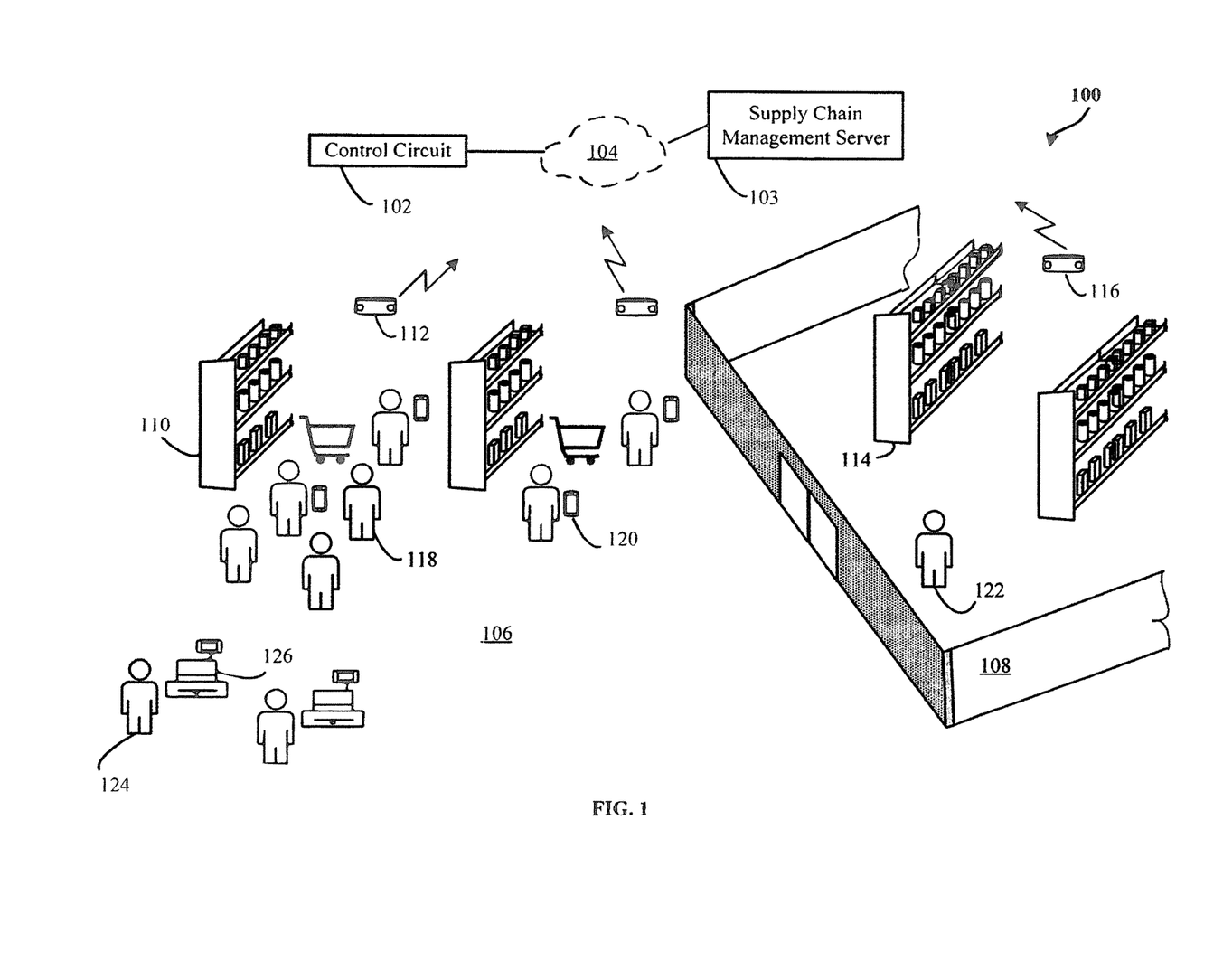
FIG. 1 is a schematic illustration of a portion of a retail facility with an exemplary system for managing shelf and stock levels in accordance with some embodiments.

FIG. 1 illustrates a portion of a physical retail shopping facility with an exemplary system 100 for managing stock levels and preventing shelf stockouts. The system 100 includes one or more image capturing devices 112, 116 disposed within the retail shopping facility and a control circuit 102 in communication therewith. The one or more image capturing devices 112, 116 may include a camera. FIG. 1 illustrates a portion of a retail shopping facility including a stock location 108 that is not generally accessible by the customers and a sales floor 106 that is generally open to customers 118 and the public. In one configuration, the system 100 includes a shelf image capturing device 112 capturing images of store racks and shelves open to the public and a stock image capturing device 116 found in the stock location 108 captures images of the stock location, which is not generally open to the public. By one approach, the store rack 110 is disposed on the sale floor that is generally available to the customers 118 and public, and the store rack 114 is located in an area of the store generally reserved for store employees, such as the stock location 108.

The one or more image capturing devices 112, 116 may be placed such that the one or more image capturing devices 112, 116 are opposite at least one of the store rack 110 or the store rack 114. The one or more image capturing devices 112, 116 may be mounted, for example, onto the store rack 110 114 or from the ceiling, among other options. The one or more image capturing devices 112, 116 may capture shelf images of the store rack 110 or the store rack 114 (or portions thereof). Further, the one or more image capturing devices 112, 116 may also capture images of at least one of a sales floor 106 or the stock location 108. Each of the images captured by the one or more image capturing devices 112, 116 may include a timestamp.

The retail store rack 110, 114 may include one or more individual shelves. By one approach, the image capturing devices 112, 116 may capture images of a shelf in the store rack 110 or the store rack 114 at periodic or predetermined intervals and a timestamp. Depending on the device or camera, a captured image may include a plurality of shelves.

Figure 2:
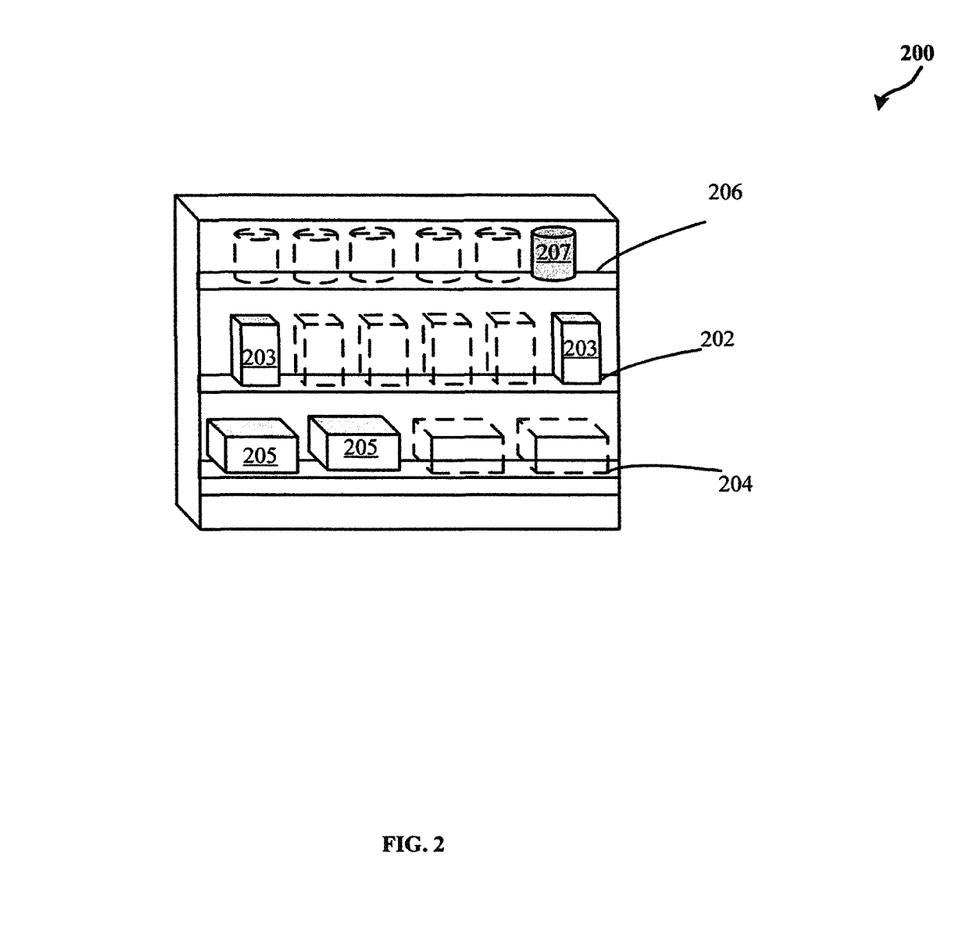
FIG. 2 is a schematic illustration of a shelf with low product levels.

Both of the image capturing devices 112, 116 may capture images of the shelves in the store rack 110, 114 at predetermined intervals throughout the day, regardless of whether the camera has an obscured view of the shelves or the store racks 110, 114. For example, at a first time, the shelf image capturing device 112 may capture a first image of the shelf in the store rack 110 and associate the first image with a timestamp. At a second time, the shelf image capturing device 112 may again capture a second image of the shelf in the store rack 110 and associate the second image with a second timestamp. As an example, the second image of the rack (or portion thereof) may depict one or more of shelves 202, 204, 206 in rack 200 in FIG. 2. FIG. 2 illustrates the image of the rack 200 with low stock levels, such that some of the products may be nearing a stockout status on the shelves 202, 204, 206. While the rack 200, at the first time, may have included six of a first product (five of which are shown in dashed lines in FIG. 2) located on the shelf 206, six of a second product located on the shelf 202 (four of which are shown in dashed lines in FIG. 2), and four of a third product (two of which are shown in dashed lines in FIG. 2) located on the shelf 204, these products are not on the shelves at the second time, as captured in FIG. 2. Indeed, at the second time, the rack 200 has a relatively low shelf supply such that at least shelves 206 and 202 are nearly empty.

A nearly empty shelf can indicate that the retail facility has not restocked the shelf with product from a stock room or store room, and/or it also may indicate that the product is nearly out of stock or a stockout. Either way, the shelves 202, 204, 206 should either be replenished with product from the stock room and/or additional products should be ordered from a distribution center, supplier or other similar entity. For example, in FIG. 2, there is one product 207 on shelf 206, two products 203 on shelf 202, and two products 205 on shelf 204 in the rack 200. Once the control circuit 102 has received the image of the depleted store shelf (and analyzed the image by comparing it to previous images to determine the low show supply), the control circuit may generate a shelf depletion warning or an instruction to a store associate or employee to reshelf the products 207, 203, and 205. Further, while the rack 200 may correspond to one of the store rack 110 that is located on the sales floor 106 of the retail shopping facility or the store rack 114 that is located in the stock location 108 of the retail shopping facility. If the depleted stock or low supply is found on a stock shelf 114, the control circuit 102 may send a requested or notice to a supply chain management server to initiate delivery of product from a distribution center or supplier. In addition, this information may help forecast retail restocking needs as discussed below.

As noted above, the system 100 may include a control circuit 102 in communication with the one or more image capturing devices 112, 116. The control circuit 102 may be coupled to one or more distributed communication networks 104 and a supply chain management server 103. The control circuit 102 may analyze the captured images of at least one of shelves of the store rack 110 or the store rack 114 (or portions thereof) by comparing brightness, contrast levels, and luminous intensity. The comparison may be performed at a particular frequency between at least two captured shelf images of a particular store rack 110, 114 and the associated shelf timestamp. Furthermore, multiple captured images may be compared to determine a rate of shelf product depletion for a particular retail product. The control circuit 102 may process the captured images of the store racks 110, 114 via image contrast enhancement or dynamic range reduction, as mentioned above.

As illustrated in FIG. 1, the image capturing devices 112, 116, point of sale terminals 126, the control circuit 102, the associate device(s) 120, and the supply chain management server 103, if present, may be communicatively coupled, either directly or indirectly, such as over one or more distributed communication networks 104, which may include, for example, LAN, WAN, Internet, cellular, Wi-Fi, and other such communication networks or combinations of two or more of such networks.

The control circuit 102 may also send a depletion warning to the associate device 120, a central computer, and/or a supply chain management server 103. The depletion warning is typically for a particular retail item on the store rack 110, 114. For example, if the particular retail item corresponds to the first product 207 on the shelf 206 of FIG. 2, a notice or warning may be sent to the associate device 120 (FIG. 1) noting that five retail products 207 should be restocked or shelved on shelf 206. In addition to indicating the type of product, the notice may include the estimated number of products needed to restock a shelf, the location (e.g., the aisle, rack, and/or shelf) of the restocking need or where the products should be restock (this may be particularly helpful for products shelved in several locations within a store or where the products are frequently moved within a store), among other information. By one approach, the associate device 120 may include a smartphone, a tablet, a computer, a watch, or a mini-tablet, among other devices. In addition, the central computer or supply chain management server 103 may include a local server or a cloud server in communication via the network 104. Further, as noted above, the captured images of the store racks 110,114 may be analyzed by the control circuit 102 by comparing groups of clustered pixels from the captured shelf images of the at least one of the shelf of the store rack 110 or the shelf of the store rack 114.

As suggested above, the control circuit 102 may send or generate a depletion warning depending on the information received or obtained from the image capturing devices 112, 116. The depletion warning may correspond to at least one of a stock depletion warning or a shelf depletion warning. For example, the stock depletion warning may be associated with a product item on the shelf of rack 114 in the stock location 108 nearing stockout. The shelf depletion warning also may be associated with a product item on the shelf of the store rack 110 on the sales floor 106 nearing low shelf supply, which also may be nearing stockout. The shelf depletion warning or the stock depletion warning includes at least one of a rate of shelf product depletion, a rate of stock depletion, a shelf request, a stock request, or historical rate depletion information. As used herein, the shelf depletion warnings, if configured to update the supply chain management server 103 and the associate devices 120, should help prevent the occurrence of an empty shelf or a stockout in the stock location 108.

The control circuit 102 also may be in communication with the one or more point of sale terminals 126. The one or more point of sale terminals 126 are configured such that customers may check out or purchase their retail items (store items) at by paying for them at the point of sale terminal. In addition, the point of sale terminal may track purchases of retail products (such as the products 203, 205, 207) and communicate the number of purchased products (purchased store items) to the control circuit 102 or may communication the occurrence of a product being purchases such that the control circuit 102 can track the sale of purchased items.

With information from the point of sale terminals 126 and the image capturing devices 112, 114, the control circuit 102 also may compare product depletion rates obtained from comparing images and purchased depletion rates of the products by tracking purchased items. This may help identify product theft or improperly shelved products.

The one or more image capturing devices 112, 116 and the control circuit 102 are in communication therewith such that the system 100 may conduct real-time image analysis to permit the control circuit 102 to determine rates of product depletion for a plurality of retail products, such as those shown in FIG. 2. In one approach, the system 100 may instruct one or more workers of the retail shopping facility, via the associate device 120, to restock retail products with a higher rate of the product depletion than those retail products with lower rates of the product depletion. For example, the control circuit 102 may determine that the first product item on the shelf 206 has the higher rate of product depletion among the product items in the rack 200. The control circuit 102 may determine that the second product item on the shelf 202 and the third product item on the shelf 204 have lower rates of the product depletion and can be restocked at a later point without impacting product availability on the store shelves.

The control circuit 102 also may determine a profit margin for a plurality of retail products in the retail facility. Further, the control circuit 102 may instruct an associate or store clerk, via the associate device 120, to restock the retail products according to their profit margin such that highest margin products are stocked before lower margin products. In one configuration, products having a similar rate of the product depletion are restocked or re-shelved in an order of highest margin to lowest margin. For example, the control circuit 102 may determine that the third product 205 on the shelf 204 has a higher margin than the first product 207 on the shelf 206 or the second product 203 on the shelf 204. The first product item on the shelf 206 may be determined by the control circuit 102 to have the lowest margin. In some configurations, the control circuit 102 may instruct an associate to restock the third product 205 with the higher margin before either of the other products. In another configuration, the control circuit 102 may also analyze product depletion rates for the products and/or send estimated depletion rate notifications to the associate device 120 so that associates can plan shelf restocking based on anticipated depletion. In yet another configuration, the control circuit 102 may calculate estimated depletion rates and provide them to the store associates for planning purposes.

Having real-time image analysis of recently obtained images can be particularly beneficial for fast moving products where the information from the point of sale terminals 126 may not be completely aligned with product status on the shelves. For example, after the customers 118 have selected a plurality of products from the shelves and placed them into their carts or baskets (i.e., the products are not available to other customers), but before the customers 118 have paid for their items, the point of sale terminals 126 may incorrectly consider those products to be presently located on the shelves, without further information. On the other hand, the image capturing devices 112, 114 that have recently captured an image of the shelves and racks 110, 114 may be able to ascertain the current status of the shelves with the products removed therefrom. Accordingly, for certain products and/or situations, the image capturing devices 112, 114 may provide more up-to-date information about the status of the store shelves. This distinction may be particular important for fast moving items. For example, while The control circuit 102 may prepare a report of at least one of depletion rates, depletion time, frequency of restocking, customer traffic, or estimated depletion rates. The report may be sent by the control circuit 102 to the associate device 120 so that the one or more workers may further plan, based on the report, to restock at least one of the shelf in rack 110 or the shelf in the store rack 114.

At times, shopping carts, baskets, one or more of the customers 118, and/or one or more workers 122, 124 of the retail shopping facility may obscure the images of the image capturing devices 112, 116. For example, an individual may be disposed in between the image capturing devices 112, 116 and one of the shelf in the store rack 110 or the store rack 114 at the time an image of the shelf is captured. In one embodiment, the one or more image capturing devices 112, 116 are configured to delete images with carts, individuals (e.g., the customers 118 or the one or more workers 122, 124) or other bodies obscuring a view of a particular retail store shelf. In one configuration, the one or more image capturing devices 112, 116 may track a number of deleted images and report the number of deleted images to the control circuit 102. In another configuration, all of the images from the one or more image capturing devices 112, 116 are transferred to the control circuit 102, and the control circuit 102 may analyze the images and delete those with obscured images.

The control circuit 102 may receive a report of the number of deleted images from the one or more image capturing devices 112, 116 or may calculate the deleted images after deletion thereof. Further, the control circuit 102 may estimate customer traffic based on the number of deleted images in a given time period. In addition, based partly on the estimated customer traffic, the control circuit 102 may calculate a plurality of estimated rates of shelf product depletion rates. The control circuit 102 may further correlate the estimated customer traffic with a point-of-sale (POS) system to refine the determination of the estimated product depletion rate.

In one embodiment, the control circuit 102 may compare a rate of shelf product depletion with a rate of stock product depletion. This may help inform the store management whether additional product should be ordered. By one approach, the rate of shelf product depletion is the rate of depletion on shelves on the floor 106 where customers are shopping, whereas the rate of stock product depletion corresponds to the rate of depletion of product items in the stock room or location 108. In response to determining that particular products in the stock location 108 have reached a predetermined threshold (possibly based on the comparison of the rate of shelf product depletion), the control circuit 102 may send a request to a distribution center to restock the particular product item in the stock location 108 and/or a purchase order or a delivery request to a supplier or vendor for a predetermined amount of the particular product item in the stock location 108. In another embodiment, the control circuit 102 may, prior to sending the at least one of the delivery request to the supplier, determine whether the distribution center has the predetermined amount of the particular product item in the stock location 108.

In another embodiment, the control circuit 102 may compare the captured shelf images of the at least one of the one or more image capturing devices 112, 116 with a planogram to determine whether the captured shelf images correspond with the planogram. In another embodiment, the control circuit 102 may not require a planogram be input or provided thereto, but the control circuit 102 may deduce the intended shelving configuration based on fully stocked shelves over a certain period of time. If the control circuit 102 determines that the shelves do not correspond with the planogram or other deduced intended shelf configuration, the control circuit 102 may send a signal to an employee management system indicating that one or more shelves in the captured shelf images are to correspond to the planogram. In response to receiving the signal, the employee management system may be configured to send at least one of a text message or an audio message to the associate device 120. The text or audio message may indicate that the one or more shelves are to correspond to the planogram and may indicate the product and amount that should be stocked. The associate device may further include a display device or a speaker.

Figure 3:
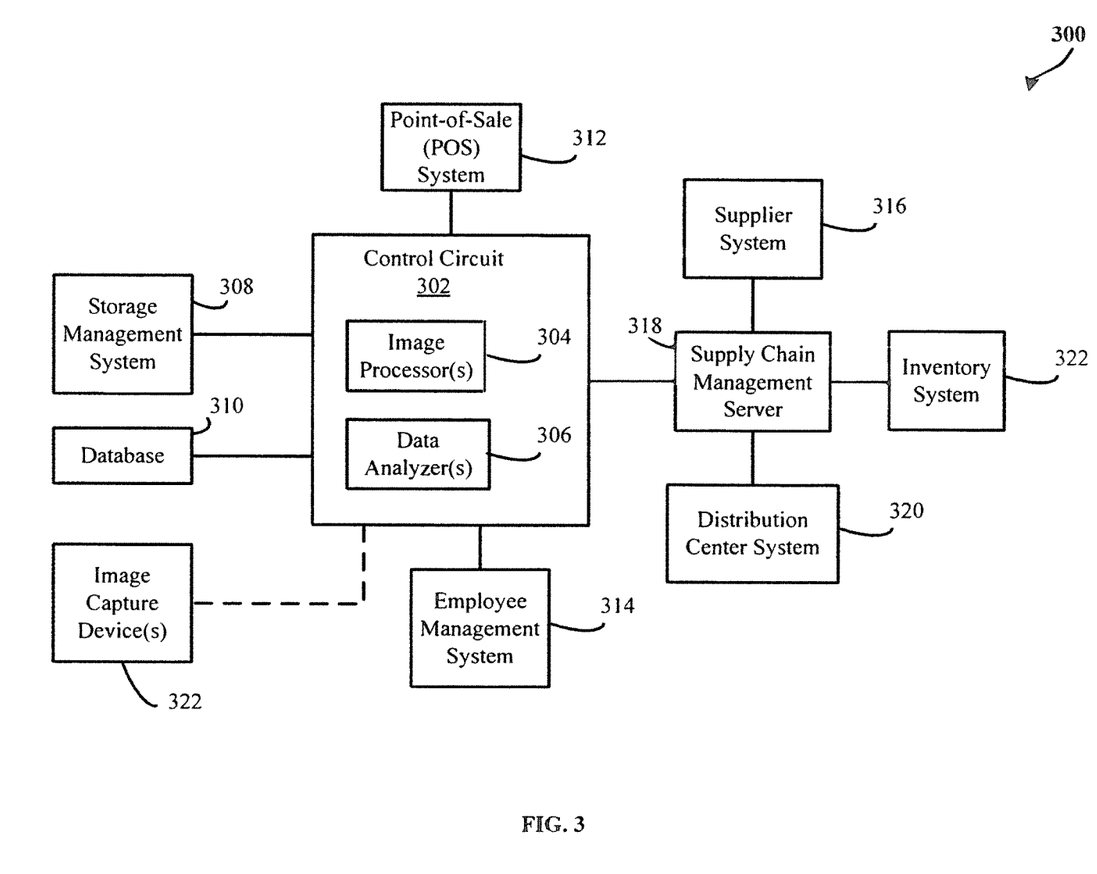
FIG. 3 is an exemplary block diagram of a systems for managing stock levels in accordance with some embodiments.

FIG. 3 is an exemplary block diagram illustrating a system 300 for managing stock levels. The system 300 includes a control circuit 302 coupled to one or more systems, servers, or components. The control circuit 302 may correspond to the control circuit 102 of FIG. 1. The control circuit 302 may include one or more image processors 304. The one or more image processors 304 may process brightness, contrast levels, and luminous intensity of one or more captured images. The one or more image processors 304 may also process the one or more captured images via image contrast enhancement or dynamic range reduction. In one embodiment, the one or more image processors 304 may compare the one or more captured images with a planogram to determine whether the one or more captured images correspond with the planogram.

The control circuit 302 may include one or more data analyzers 306. The one or more data analyzers 306 may determine customer traffic based on a number of deleted captured images and determined rates of product depletion (or estimated rates of product depletion) that is based, in part, on the customer traffic. The one or more data analyzers 306 may analyze the one or more captured images and the associated timestamp to determine a rate of product depletion for a particular retail product or a particular product item. The one or more captured images may refer to images of the shelf in the store rack 110 of FIG. 1 or the shelf in rack 114 of FIG. 1.

In one embodiment, the control circuit 302 may be coupled via a network to the one or more systems, servers, or components shown in FIG. 3. The control circuit 302 may be coupled to a supply chain management server 318, a supplier system 316, a distribution center system 320, or an inventory system 322. The control circuit 302 may send a stock depletion warning for a particular stock item to the supply chain management server 318. The stock depletion warning enables the distribution center system 320 or the supplier system 316 to forecast retail restocking needs or to initiate a stock shipment.

In one embodiment, the supplier system 316, the distribution system 320, or the inventory system 322 may be part of the supply chain management server 318. In another embodiment, the supplier system 316, the distribution center system 320, or the inventory system 322 may be coupled directly to the control circuit 302 via the network. For example, the control circuit 302 may send at least one of a purchase order or a delivery request to a supplier via the supplier system 316 for a predetermined amount of a particular product item. The particular product item may correspond to one or more product items located on the sales floor 106 or the stock location 108 of FIG. 1. The control circuit 302 may determine whether the distribution center system 320 has the predetermined amount of the particular product item or whether additional products should be requested.

The control circuit 302 may be coupled to the employee management system 314. The control circuit 302 may send a signal regarding a planogram and may indicate that one or more shelves in the captured shelf images are to correspond to the planogram. The employee management system 314 may send a text message and/or an audio message to a device associated with the one or more workers of the retail shopping facility. The message may indicate that the one or more shelves are to correspond to the planogram. This associate device may correspond to the associate device 120 of FIG. 1. By one approach, the device may include a smartphone, a tablet, a computer, a display device, and/or a speaker, among others. The control circuit 302 may also provide estimated depletion rate notifications to the associate device so that the store employees may plan to restock the one or more shelves based on anticipated depletion (this also may help plan staffing levels for store management).

The control circuit 302 may correlate or compare the estimated customer traffic with information from the point of sale system 312. The point of sale system 312 may include the one or more point of sale terminals 126 of FIG. 1. The control circuit 302 may also be coupled to a storage management system 308 and a database 310. The control circuit 302 may be in communication with one or more image capture devices 322. The one or more image capture devices 322 may be coupled to the control circuit 302 via a network. The network may be a wireless network, a wired network, the one or more distributed communication networks 104, or any combination thereof. The one or more image capture devices 322 may correspond to the one or more image capturing devices 112, 116 of FIG. 1. The one or more image capture devices 322 may store the one or more captured images to the storage management system 308. The one or more image capture devices 322 may associate the one or more captured images to the database 310.

Figure 4:
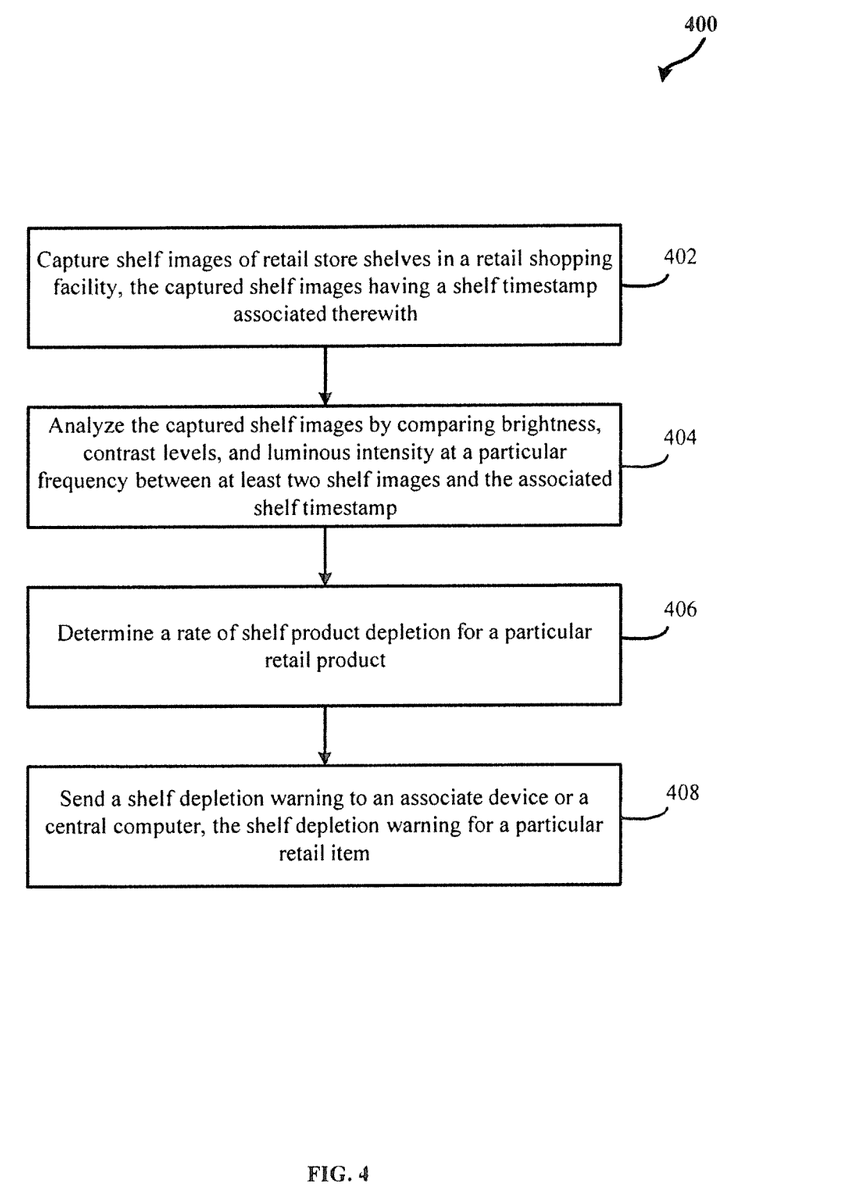
FIG. 4 is an exemplary flow diagram of a system for managing stock levels in accordance with some embodiments.

FIG. 4 illustrates a flow diagram of an exemplary method 400 for providing monitoring retail products. The exemplary method 400 may be implemented in the system 100 of FIG. 1 and/or the system 300 of FIG. 3. The method 400 includes, at step 402, capturing shelf images of retail store shelves in a retail shopping facility. The captured shelf images having a shelf timestamp associated therewith. The captured shelf images may correspond to one or more shelves on the sales floor 106 of FIG. 1. The captured shelf images may be captured by the image capturing device 112. At step 404, the captured shelf images are analyzed by comparing brightness, contrast levels, and luminous intensity at a particular frequency between at least two shelf images of the captured shelf images and the associated shelf timestamp. A rate of shelf product depletion for a particular retail product is determined, at step 406. This may occur by analyzing numerous shelf images of over time to capture the rate of product depletion on the shelf. The method 400 may also include sending a shelf depletion warning to an associate device or a central computer, at step 408. The shelf depletion warning may be for a particular retail item.

Figure 5:
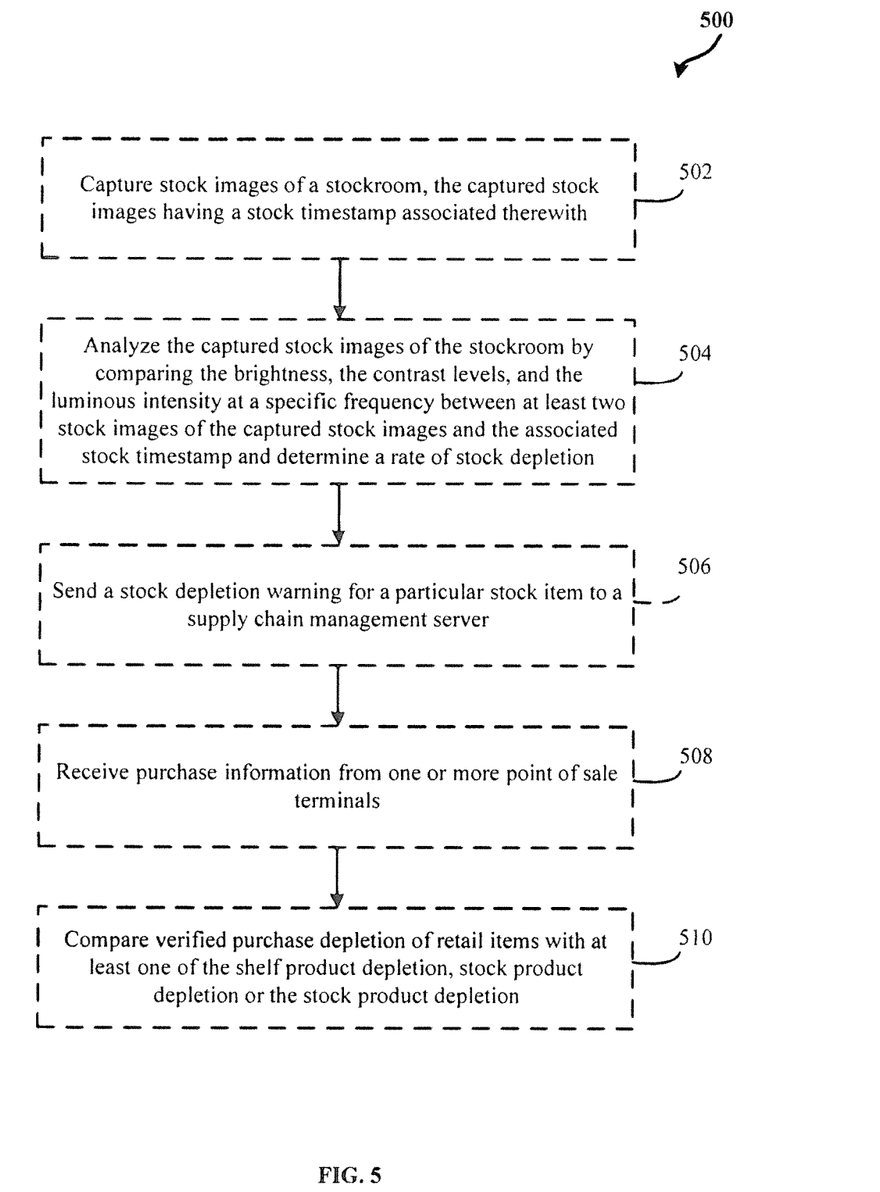
FIG. 5 is another exemplary flow diagram of a system for managing stock levels in accordance with some embodiments.

FIG. 5 shows an exemplary flow diagram of a method 500 for managing shelf or stock levels and preventing stockouts.

The method 500 may be implemented in the system 100 of FIG. 1 or the system 300 of FIG. 3. In one embodiment, steps in the method 500 may be included as additional steps in the method 400 of FIG. 4. For example, at step 502, stock images of a stockroom are captured. The captured stock images having a stock timestamp associated therewith. The captured stock images may be captured by the stock image capturing device 116. The captured stock images may be images of one or more shelves, bins, or other areas in the stock room or location 108 of FIG. 1. The captured stock images are analyzed by comparing brightness, contrast levels, and luminous intensity at a specific frequency between at least two stock images of the captured stock images and the associated stock timestamp, and by determining a rate of stock depletion, at step 504.

At step 506, a stock depletion warning for a particular stock item is sent to a supply chain management server. The particular stock item may be identified by the control circuit 102 of FIG. 1 or the control circuit 302 of FIG. 3 from the captured stock images. For example, it the particular stock item corresponds to the first product 207 on the shelf 206 of FIG. 2, and the control circuit identifies that the product 207 is below a certain threshold in the store (i.e., the product 207 is not sufficiently stocked in the stock room or location 108), the control circuit may send a notice to the supply chain management server (e.g., the supply chain management server 318 of FIG. 3).

The method 500 also may include receiving 508 purchase information from one or more point of sale terminals, e.g., the point of sale terminal(s) 126 of FIG. 1 and/or the point of sale system 312 of FIG. 3. The purchased information may be stored at the storage management system 308 and associated in the database 310 of FIG. 3. In addition, the control circuit 102 or the control circuit 302 may receive or otherwise access the purchase information. The control circuit 102 or the control circuit 302 may use the purchased information in correlating estimated customer traffic with the point of sale system 312. At step 510, verified purchase depletion of retail items is compared with at least one of the shelf product depletion, stock product depletion, or the stock product depletion.

Figure 6:
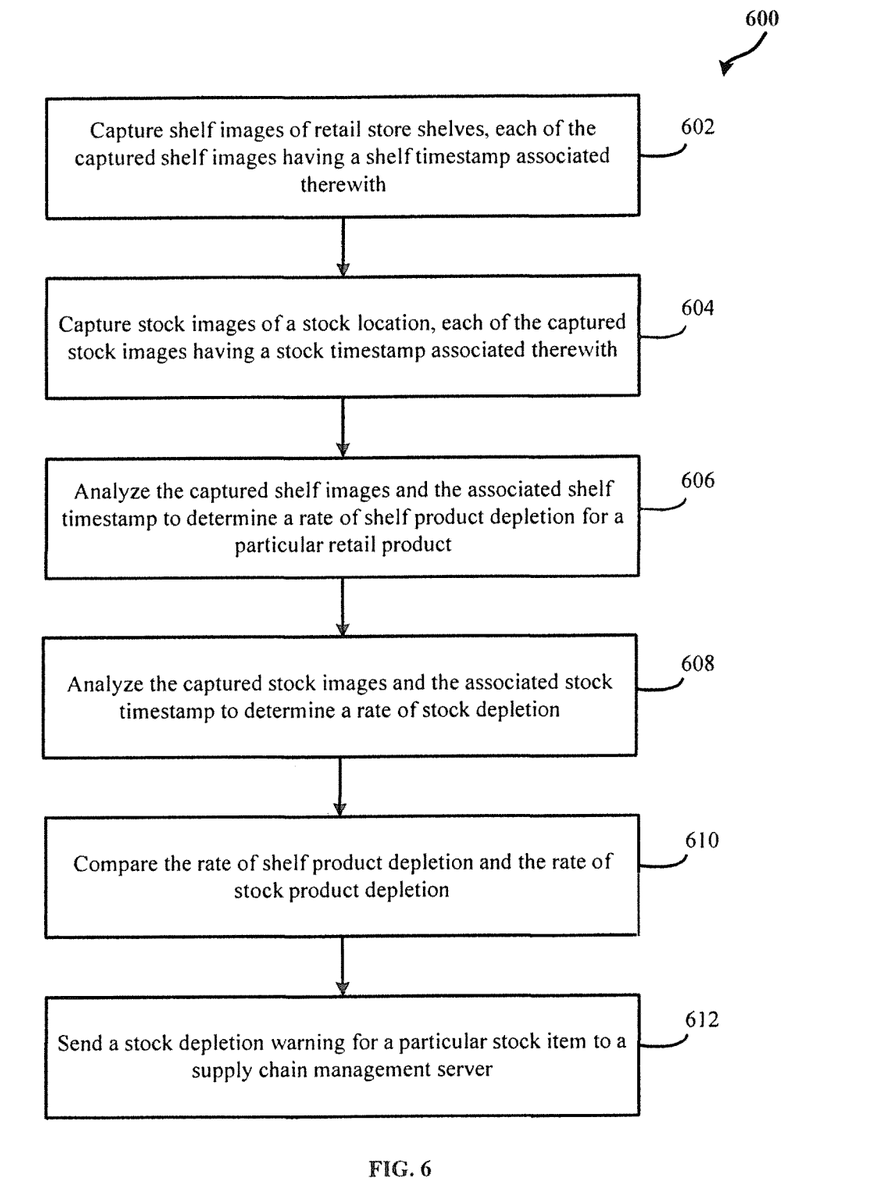
FIG. 6 is another exemplary flow diagram of a system for managing stock levels in accordance with some embodiments.

FIG. 6 illustrates a flow diagram of an exemplary method 600 for providing monitoring retail products. The exemplary method 600 may be implemented in the system 100 of FIG. 1 or the system 300 of FIG. 3. The method 600 includes, at step 602, capturing shelf images of retail store shelves. Each of the captured shelf images having a shelf timestamp associated therewith. At step 604, stock images of a stock location are captured. Each of the captured stock images having a stock timestamp associated therewith. The captured shelf images may correspond to images of the shelves on the sales floor 106 of FIG. 1, and the captured stock images may correspond to images of the shelves on the stock location 108 of FIG. 1. The captured shelf images and the associated shelf timestamp are analyzed to determine a rate of shelf product depletion for a particular retail product, at step 606. The captured stock images and the associated stock timestamp are analyzed to determine a rate of stock depletion, at step 608. At step 610, the rate of shelf product depletion is compared with the rate of stock product depletion. At step 612, a stock depletion warning for a particular stock item is sent to a supply chain management server in light of the shelf depletion rate and the stock depletion rate.

Figure 7:
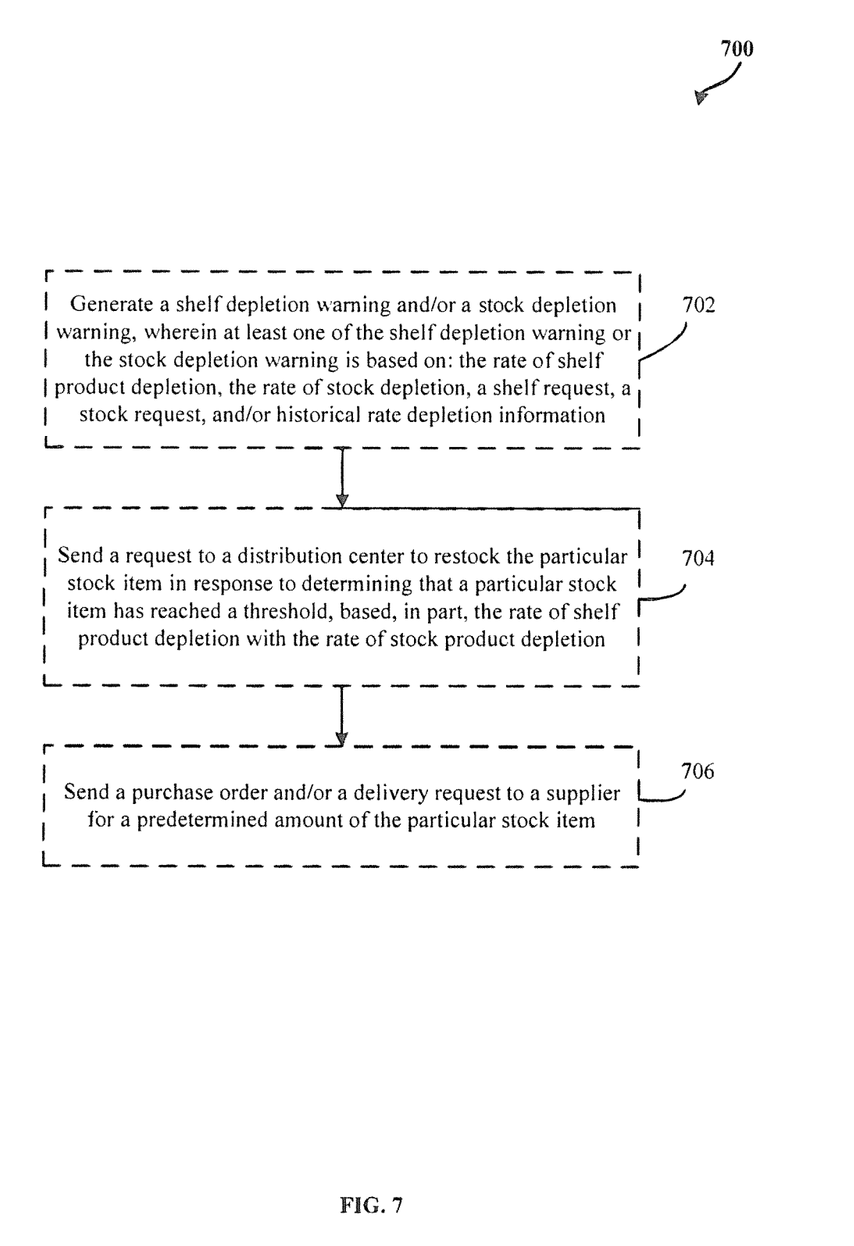
FIG. 7 is another exemplary flow diagram of a system for managing stock levels in accordance with some embodiments.

FIG. 7 an exemplary flow diagram of a method 700 for managing shelf stockouts. The method 700 may be implemented in the system 100 of FIG. 1 or the system 300 of FIG. 3. In one embodiment, steps in the method 700 may be included as additional steps in the method 600 of FIG. 6. For example, the method 700 includes, at step 702, generating at least one of a shelf depletion warning or a stock depletion warning, where at least one of the shelf depletion warning or the stock depletion warning is based on at least one of: the rate of shelf product depletion, the rate of stock depletion, a shelf request, a stock request, or historical rate depletion information. At step 704, a request is sent to a distribution center to restock the particular stock item in response to determining that a number of the particular stock item has reached a threshold based on the rate of shelf product depletion and/or the rate of stock product depletion. At step 706, a purchase order and/or a delivery request is sent to a supplier for a predetermined amount of the particular stock item.

Figure 8:
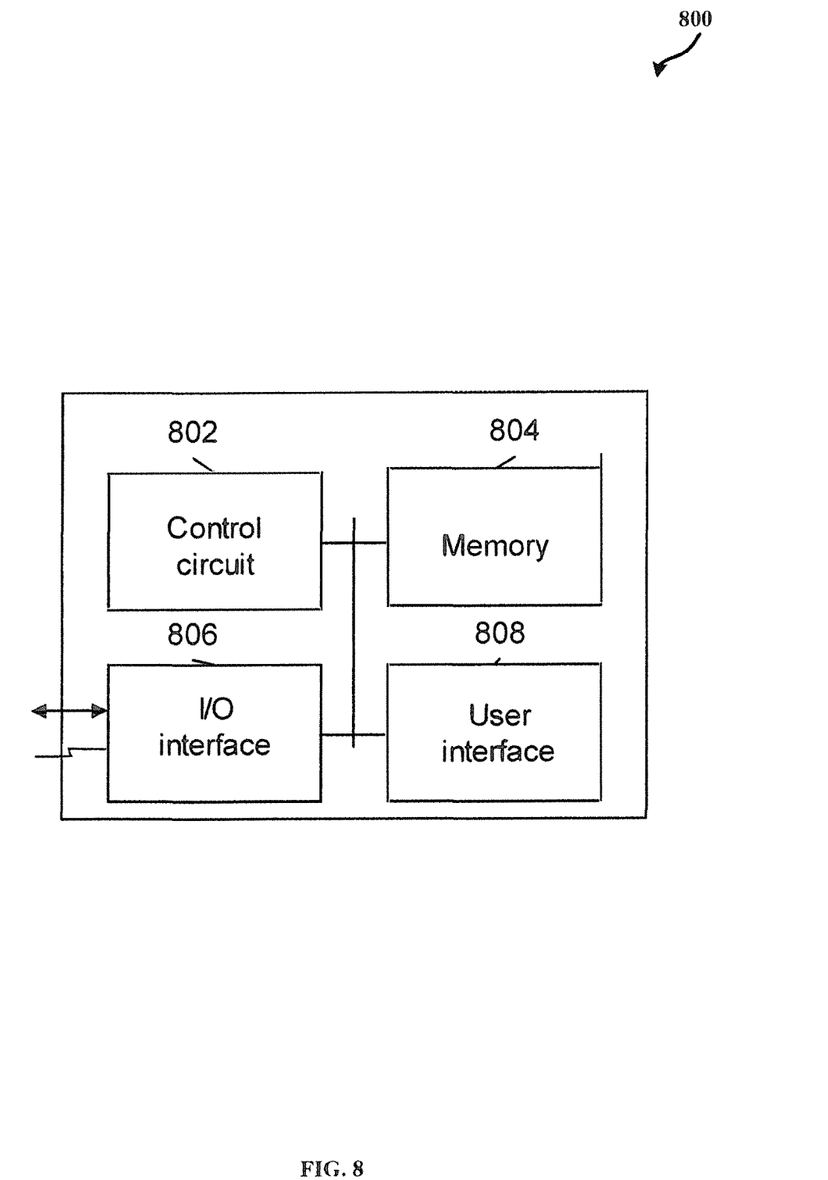
FIG. 8 illustrates an exemplary system for use in implementing systems, apparatuses, devices, methods, techniques, and the like in managing stock levels in accordance with several embodiments.

The methods, techniques, systems, devices, services, servers, sources and the like described herein may be utilized, implemented and/or run on many different types of devices and/or systems. Referring to FIG. 8, there is illustrated a system 800 that may be used for any such implementations, in accordance with some embodiments. One or more components of the system 800 may be used to implement any system, apparatus or device mentioned above, or parts of such systems, apparatuses or devices, such as for example any of the above or below mentioned control circuits, image capturing devices, point of sale terminals, associate devices, databases, devices, parts thereof, and the like. However, the use of the system 800 or any portion thereof is certainly not required.

By way of example, the system 800 may include one or more control circuits 802, memory 804, and input/output (I/O) interfaces and/or devices 806. Some embodiments further include one or more user interfaces 808. The control circuit 802 typically comprises one or more processors and/or microprocessors. The memory 804 stores the operational code or set of instructions that is executed by the control circuit 802 and/or processor to implement the functionality of the systems and devices described herein, parts thereof, and the like. In some embodiments, the memory 804 may also store some or all of particular data that may be needed to analyze images of store shelves and determine whether restocking is need or whether the store shelves closely resembled the planogram.

It is understood that the control circuit 802 and/or processor may be implemented as one or more processor devices as are well known in the art. Similarly, the memory 804 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 804 is shown as internal to the system 800; however, the memory 804 can be internal, external or a combination of internal and external memory. Additionally, the system typically includes a power supply (not shown), which may be rechargeable, and/or it may receive power from an external source. While FIG. 8 illustrates the various components being coupled together via a bus, it is understood that the various components may actually be coupled to the control circuit 802 and/or one or more other components directly.

Generally, the control circuit 802 and/or electronic components of the system 800 can comprise fixed-purpose hard-wired platforms or can comprise a partially or wholly programmable platform. These architectural options are well known and understood in the art and require no further description here. The system and/or control circuit 802 can be configured (for example, by using corresponding programming as will be well understood by those skilled in the art) to carry out one or more of the steps, actions, and/or functions described herein. In some implementations, the control circuit 802 and the memory 804 may be integrated together, such as in a microcontroller, application specification integrated circuit, field programmable gate array or other such device, or may be separate devices coupled together.

The I/O interface 806 allows wired and/or wireless communication coupling of the system 800 to external components and/or or systems. Typically, the I/O interface 806 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 808 may be used for user input and/or output display, such as the display of the point of sale terminal 126 or the associate device 120. For example, the user interface 808 may include any known input devices, such one or more buttons, knobs, selectors, switches, keys, touch input surfaces, audio input, and/or displays, etc. Additionally, the user interface 808 include one or more output display devices, such as lights, visual indicators, display screens, etc. to convey information to a user, such as but not limited to communication information, status information, notifications, errors, conditions, and/or other such information. Similarly, the user interface 808 in some embodiments may include audio systems that can receive audio commands or requests verbally issued by a user, and/or output audio content, alerts and the like.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system comprising:
   one or more shelf image capturing devices disposed within a retail shopping facility, the one or more shelf image capturing devices configured to:
   capture shelf images of retail store shelves, the captured shelf images having a shelf timestamp associated therewith;
   delete images with individuals obscuring a view of a particular retail store shelf; and
   track a number of deleted images; and
   a control circuit in communication with the one or more shelf image capturing devices, the control circuit configured to:
   analyze the captured shelf images by comparing brightness, contrast levels, and luminous intensity at a particular frequency between at least two shelf images of the captured shelf images and the associated shelf timestamp;
   estimate customer traffic based on the number of deleted images over a period of time;
   estimate a rate of shelf product depletion for a particular retail product based in part on the estimated customer traffic and on the analysis of the captured shelf images;
   determine that the particular retail product has reached a threshold based on the estimated rate of shelf product depletion; and
   send a shelf depletion warning for the particular retail product to an associate device or a central computer in response to the determination that the particular retail product has reached the threshold.

2. The system of claim 1, wherein the captured shelf images are analyzed by comparing groups of clustered pixels from the captured shelf images.

3. The system of claim 1, further comprising one or more stock image capturing devices disposed within a stockroom of the retail shopping facility and configured to capture stock images of a stock location, the captured stock images having a stock timestamp associated therewith, wherein the control circuit is in communication with the one or more stock image capturing devices and configured to:
   analyze the captured stock images by comparing the brightness, the contrast levels, and the luminous intensity at a specific frequency between at least two stock images of the captured stock images and the associated stock timestamp to determine a rate of stock depletion; and send a stock depletion warning for a particular stock item to a supply chain management server, thereby permitting a distribution center or a supplier to forecast retail restocking needs or to initiate a stock shipment.

4. The system of claim 3, wherein the shelf depletion warning or the stock depletion warning includes at least one of the rate of shelf product depletion, the rate of stock depletion, a shelf request, a stock request, or historical rate depletion information.

5. The system of claim 1, further comprising one or more point of sale terminals in communication with the control circuit, the one or more point of sale terminals configured to track purchases of store items and communicate the purchased store items to the control circuit.

6. The system of claim 5, wherein the control circuit compares purchased depletion of the store items via the one or more point of sale terminals with at least one of the rate of shelf product depletion or the rate of stock depletion.

7. The system of claim 1, wherein the one or more shelf image capturing devices and the control circuit in communication therewith permit real-time image analysis to permit the control circuit to determine rates of shelf product depletion for a plurality of retail products and instruct the associate device to restock retail products with a higher rate of the shelf product depletion than those retail products with lower rates of the shelf product depletion.

8. The system of claim 7, wherein the control circuit is further configured to determine a profit margin for the plurality of retail products and instruct the associate device to restock retail products having a similar rate of the shelf product depletion in an order of highest profit margin to lowest profit margin.

9. The system of claim 1, wherein the one or more shelf image capturing devices are configured to report the number of deleted images to the control circuit.

10. The system of claim 9, wherein the control circuit is further configured to correlate the estimated customer traffic with a point-of-sale (POS) system to refine the estimation of the rate of shelf product depletion.

11. The system of claim 10, wherein the control circuit is further configured to provide estimated depletion rate notifications to the associate device so that associates can plan shelf restocking based on anticipated depletion.

12. The system of claim 10, wherein the control circuit is configured to prepare a report of at least one of depletion rates, depletion time, frequency of restocking, the customer traffic, or estimated depletion rates.

13. The system of claim 1, wherein the control circuit is further configured to process the captured shelf images via image contrast enhancement or dynamic range reduction.

14. A computer-implemented method for monitoring retail products comprising:
- capturing, by one or more shelf image capturing devices disposed within a retail shopping facility, shelf images of retail store shelves in the retail shopping facility, the captured shelf images having a shelf timestamp associated therewith;
- deleting, by the one or more shelf image capturing devices, images with individuals obscuring a view of a particular retail store shelf;
- tracking, by the one or more shelf image capturing devices, a number of deleted images;
- analyzing, via a control circuit, the captured shelf images by comparing brightness, contrast levels, and luminous intensity at a particular frequency between at least two shelf images and the associated shelf timestamp;
- estimating, by the control circuit, customer traffic based on the number of deleted images over a period of time;
- estimating, by the control circuit, a rate of shelf product depletion for a particular retail product based in part on the estimated customer traffic and on the analysis of the captured shelf images;
- determining, by the control circuit, that the particular retail product has reached a threshold based on the estimated rate of shelf product depletion; and
- sending, by the control circuit, a shelf depletion warning for the particular retail product to an associate device or a central computer in response to the determination that the particular retail product has reached the threshold.

15. The method of claim 14, further comprising capturing stock images of a stockroom, the captured stock images having a stock timestamp associated therewith, wherein the analyzing of the captured shelf images includes comparing groups of clustered pixels from a plurality of captured shelf images.

16. The method of claim 15, further comprising analyzing the captured stock images of the stockroom by comparing the brightness, the contrast levels, and the luminous intensity at a specific frequency between at least two stock images of the captured stock images and the associated stock timestamp and determining a rate of stock depletion.

17. The method of claim 16, further comprising sending a stock depletion warning for a particular stock item to a supply chain management server.

18. The method of claim 16, further comprising receiving purchase information from one or more point of sale terminals.

19. The method of claim 18, further comprising comparing verified purchase depletion of retail items with at least one of the shelf product depletion or the stock product depletion.

20. The method of claim 14, further comprising correlating, by the control circuit, the estimated customer traffic with a point-of-sale (POS) system to refine the estimation of the rate of shelf product depletion.

* * * * *